United States Patent [19]

Dagnelie

[11] 4,214,123

[45] Jul. 22, 1980

[54] BIDIRECTIONAL TELEWRITING SYSTEM OPERATING IN AN ALTERNATING MODE OVER A SINGLE CARRIER

[75] Inventor: Jean-Paul G. Dagnelie, Rennes, France

[73] Assignee: Etablissement Public de Diffusion dit "Telediffusion de France", Montrouge, France

[21] Appl. No.: 939,188

[22] Filed: Sep. 5, 1978

[30] Foreign Application Priority Data

Sep. 26, 1977 [FR] France ............................... 77 29413

[51] Int. Cl.[2] ........................ H04L 5/16; G08C 21/00

[52] U.S. Cl. ........................................ 370/31; 178/19

[58] Field of Search ......................... 178/18, 19, 58 A; 179/3, 2 C, 2 DP

[56] References Cited

U.S. PATENT DOCUMENTS

| | | | |
|---|---|---|---|
| 3,496,293 | 2/1970 | Avery et al. | 178/58 A |
| 3,851,097 | 11/1974 | Rodgers | 178/19 |
| 4,071,690 | 1/1978 | Joannou | 178/18 |
| 4,125,743 | 11/1978 | O'Boyle et al. | 178/18 |

FOREIGN PATENT DOCUMENTS 2226090 12/1973 Fed. Rep. of Germany .

*Primary Examiner*—Thomas A. Robinson

*Attorney, Agent, or Firm*—Laff, Whitesel & Rockman

[57] ABSTRACT

A bidirectional telewriting system for two-way transmission of telewriting data over a transmission channel which is shared by a speech link. A frequency window is used within the speech frequency band, within which a single carrier is used. A commutator at each terminal causes a reversal in the direction of transmission of the telewriting data over the single carrier.

7 Claims, 5 Drawing Figures

Figure 1:
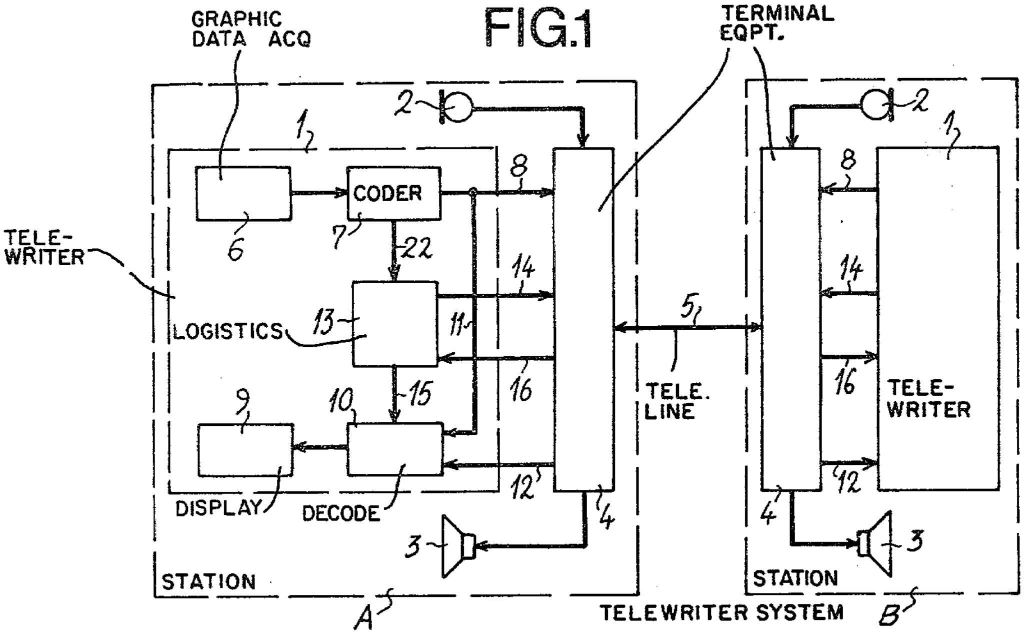

BIDIRECTIONAL TELEWRITING SYSTEM OPERATING IN AN ALTERNATING MODE OVER A SINGLE CARRIER

The present invention concerns a bidirectional telewriting system generally associated with a bidirectional telephony system.

From day to day, the importance of and interest in telewriting apparatus is increasing. It will be recalled that a telewriting apparatus consists of graphics acquisition means, placed at both ends of a transmission line or channel. These can take various forms such as: a graphics table, a light pen, a ball point etc. whose co-ordinates are periodically retrieved, then coded and transmitted via the transmission line or channel to the receiving end, where display means such as cathode ray tubes, plasma panels, tracing tables, etc. are available to display the co-ordinates of the received signals.

However, we know that teleconferencing systems, which allow for example the maintenance of audio contact between two groups of lecturers respectively reunited in different cities, are increasingly being used. We also know that at traditional conference meetings, many lecturers use a blackboard to illustrate drawings or brief comments in order to sustain their arguments. Thus, it is natural to attempt to complement acoustic teleconferencing systems by graphic teleconferencing systems. To do this, each lecturer has, at his disposal, on one hand a graphics table, to permit him to transmit his graphical information and on the other hand, a screen display to receive the graphical information from others. All schematic drawings drawn with a special pen on the graphics table are reproduced both locally and remotely on all the lecturers' display screens. Each lecturer can then, from his own graphics table, modify or complete the schematic already traced.

The numerical data rate of the transmission media necessary for the telewriting apparatus is minimal, when instead of being printed on paper or a similar process, the data is stored in an electronic memory, in the form of a set of (x,y) co-ordinates. By considering the redundancy, the amount of information transmitted can be reduced. Thus, it is sufficient to allow for the transmission of telewriting information at a rate of 200 Bauds. This makes it possible to transmit this information on the media used for the transmission of speech by assigning, from the classical speech frequency band, a window of approximately 200 Hz, for the transmission of telewriting information.

It is obviously possible to allow within the speech frequency band a window having double the width, that is, 400 Hz, thus allowing the transmission of telewriting information in one direction on one carrier and in the other direction on another carrier. However, it is preferable to use a single carrier for both directions because identical terminal equipment can be used in all cases. Therefore, allowance should be made for operation in an alternating mode, in order to avoid the collision of the telewriting information transmitted by the terminal equipment.

One object of the present invention consists of providing a bidirectional telewriting system, using a window in the speech frequency band of an associated bidirectional telephone system, making use of a single carrier and operating automatically in an alternate fashion.

As one embodiment of the invention, such a system can be described as follows: a bidirectional telewriting system, operating in an alternating mode on a single carrier, having two telewriting apparatus respectively placed at both ends of a telewriting data transmission link which is itself connected to a coupler in each apparatus. The input of each coupler is connected by a transmission link to the output of a modulator, which modulates the carrier in relation to the local telewriting information and the output is connected by a reception link to the input of the demodulator which demodulates the incoming signal. The modulator is connected to a telewriting transmitter in a well known manner and the demodulator is connected to an information display device in a well known manner. Commutators, which close one link and open another and vice versa are located in both the transmission and reception links. These commutators are operated by a control circuit which makes them alternately close the transmission and reception links when the transmitters in the above apparatus are at rest. The control circuit maintains a closed connection of the transmission link, when the transmitter associated with it is in the working mode and the transmission link is already connected. The control circuit, at the other apparatus, applies to its associated commutators control signals such that the states of the links are inverted with respect to those in the first apparatus. Passage to the rest state of the above mentioned transmitter results in inverting the states of the associated links.

In another embodiment, each control circuit consists of one monostable circuit which is triggered by a drop in the carrier coming from the input line to the demodulator. The output of the monostable circuit is connected to a logic circuit, which forces closure of the transmission link, when the monostable circuit is triggered or upon detection of the working mode of the transmitter at the time the monostable circuit is triggered.

Figure 3:
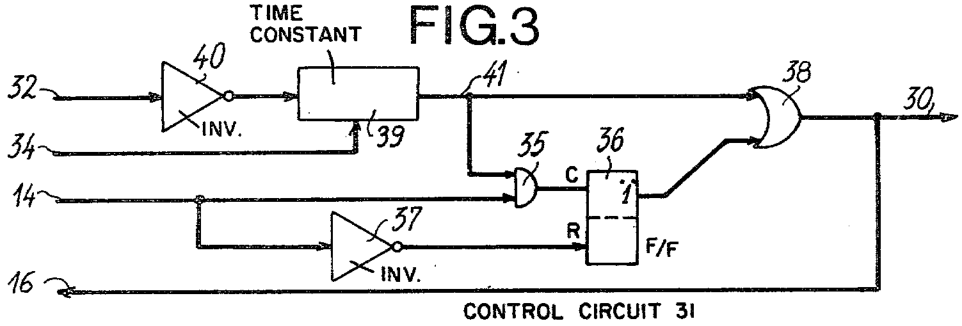
Figure 4:
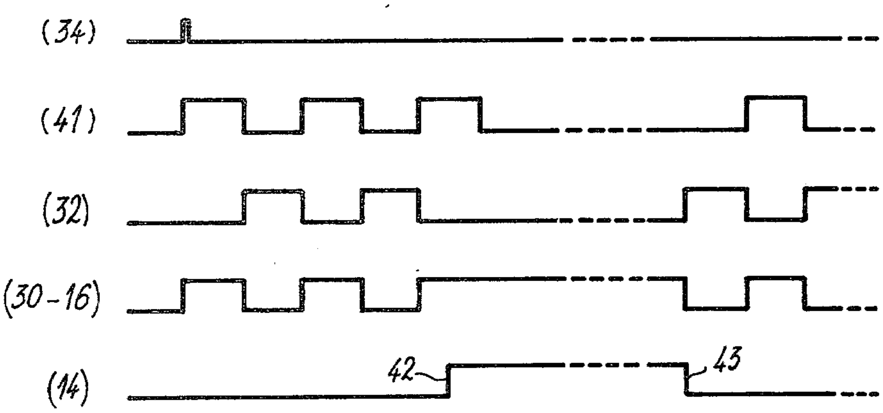
Figure 2:
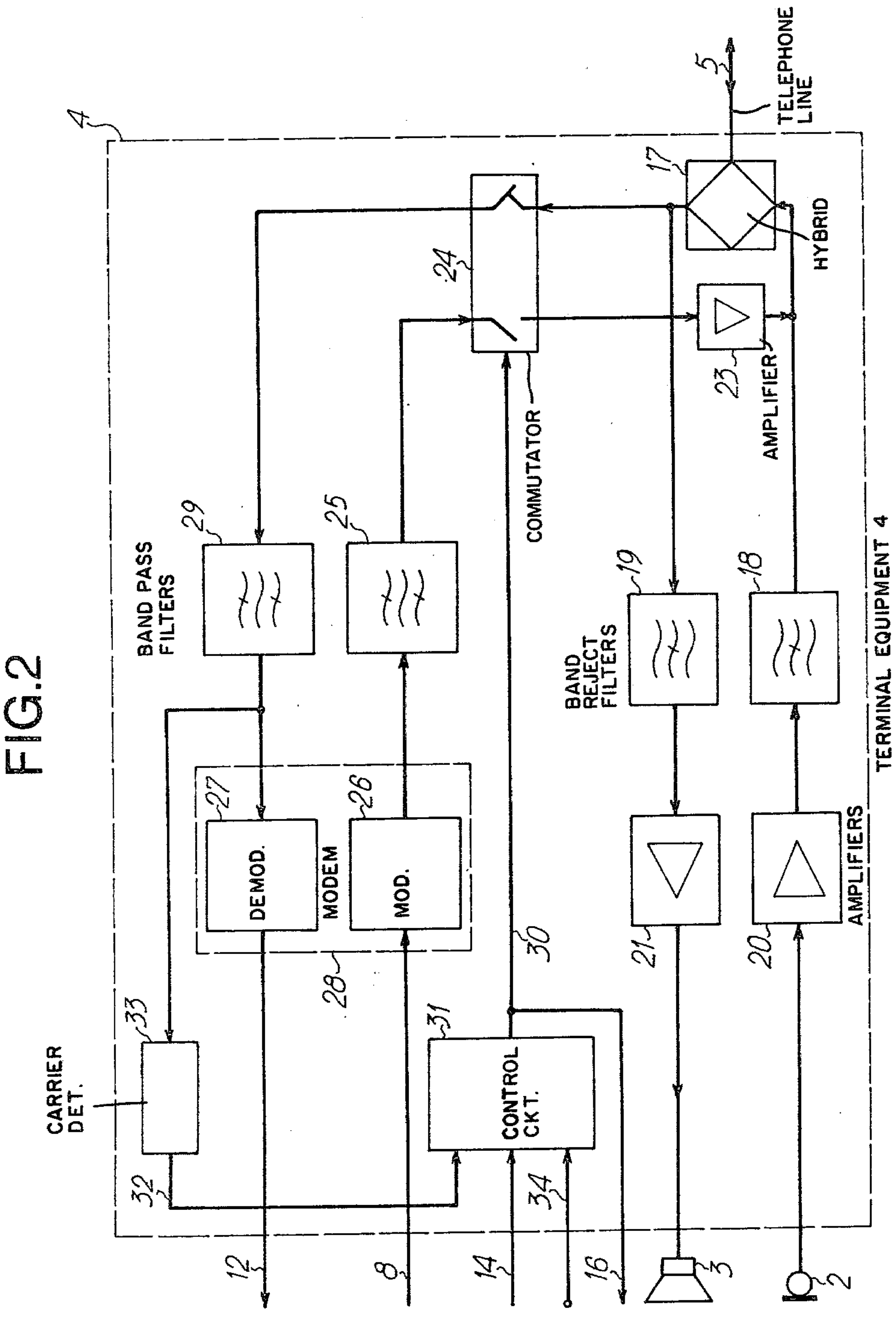
Figure 5:
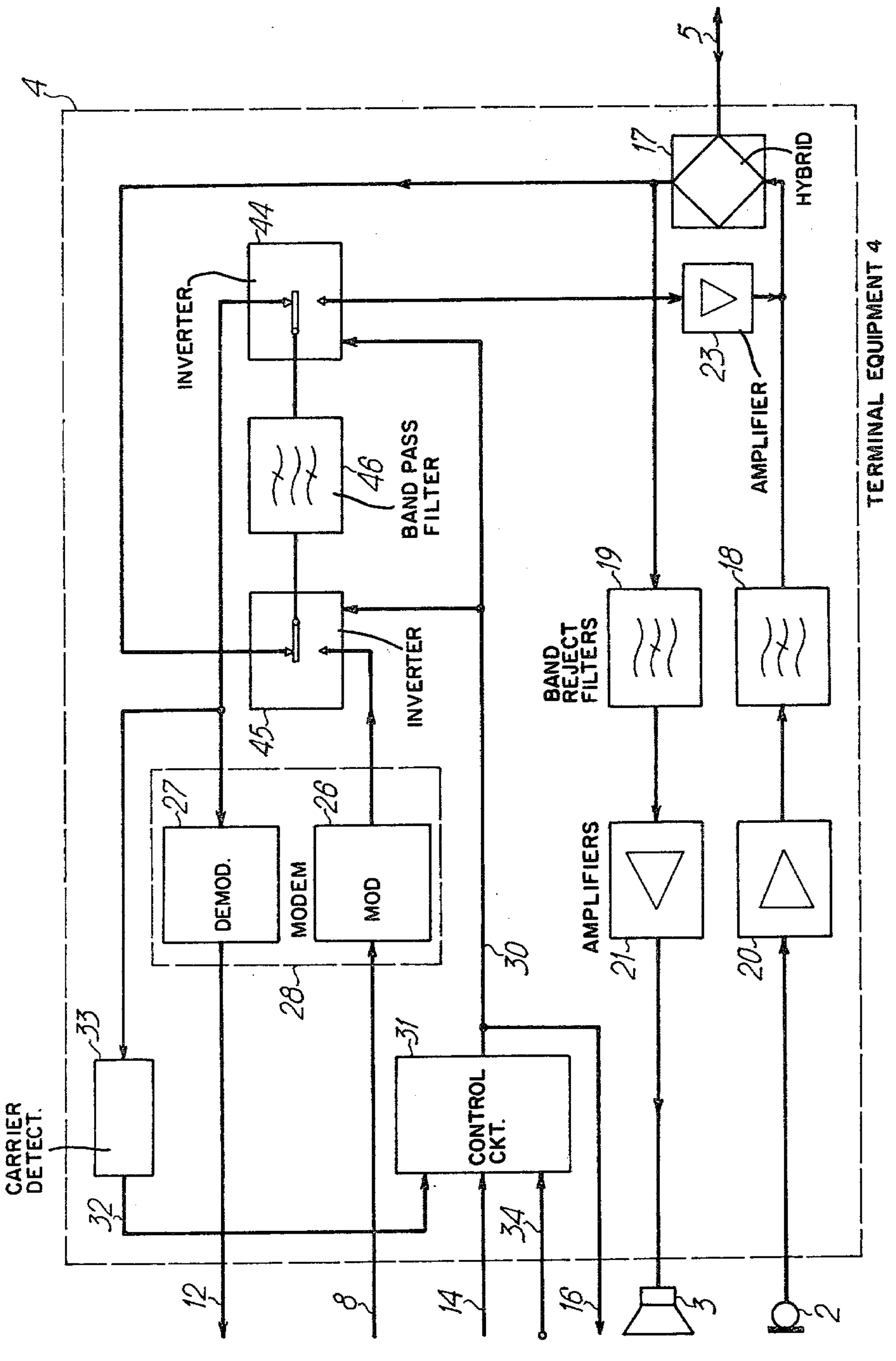

The aforenoted embodiments of the present invention and others will become clearer after reading the following description of specific examples. This description is related to the following figures, in which:

FIG. 1 is the block diagram of a telewriting system according to the present invention, FIG. 2 is the block diagram for a first example of the terminal equipment for the system in FIG. 1, in relation to an associated bidirectional telephony system, FIG. 3 is the schematic diagram of a control circuit used in the equipment of FIG. 2, FIG. 4 shows signal waveforms which illustrate the operation of the control circuit shown in FIG. 3, and FIG. 5 is a block diagram of a variation of the equipment shown in FIG. 2.

The telewriting system shown in FIG. 1 consists of telewriting apparatus 1, a microphone 2, a speaker 3 and terminal equipment 4, thus completing the setup for a station A, at one end of a telephone line 5, of which an identical station B is at the other.

The telewriting apparatus 1 is comprised of a graphical data acquisition means 6, such as a graphics table with associated pen of well known form, a coder 7, which receives the data from the acquisition means 6 to transmit it via link 8 to the terminal equipment 4, a screen display 9 such as a television screen, a decoder 10 that transmits to the screen 9, either the data which it receives from the coder 7 via link 11, or the data that it receives from the terminal equipment 4 via link 12, and a logistics circuit 13 which receives commands either from the coder 7 via link 22 or from the terminal equipment 4 via link 16 and then transmits commands either to the decoder 10 via line 15 or to the terminal equipment 4 via link 14.

The terminal equipment 4 is linked on one hand to the microphone 2 and on the other to the speaker 3.

The terminal equipment shown in FIG. 2 is comprised of a bidirectional telephone line 5, a well known differential transformer coupler or hybrid circuit 17, having one input connected to the output of a band-reject filter 18 and one output connected to the input of a band-reject filter 19. The input of the band-reject filter 18 is connected to the output of a low frequency amplifier 20 whose input is connected to the microphone 2. The output of the band reject filter 19 is connected to the input of low frequency amplifier 21 whose output is connected to the speaker 3. The band-reject filters 18 and 19 in a well known manner avoid mixing the speech and telewriting signals by rejecting speech signals within the frequency window alloted for the telewriting signals. The amplifiers 20 and 21 respectively match the impedances and levels of the microphone 2 and the speaker 3 to the line 5.

The input terminal to the coupler 17 is linked to the output of an amplifier 23 which in turn is linked through a commutator 24 to the output of a bandpass filter 25, whose input comes from the output of a modulator 26, which forms with demodulator 27 that which will be referred to as a modem 28. The output terminal of the coupler 17 is similarly linked through a commutator 24, to the input of a bandpass filter 29 whose output is linked to the input of the demodulator 27. The bandpass filters 25 and 29 allow only the passage of frequencies within the frequency window intended for the transmission of telewriter signals which the carrier uses for this transmission. The commutator 24 has its control input linked by line 30 to a control circuit 31. Depending on the applied control, the commutator 24 either links the filter 25 to the amplifier 23 and opens the link between the coupler 17 and the filter 29, or vice versa. Amplifier 23 is used to match the output level of filter 25 to the line 5.

The control circuit 31 has one input connected to link 14, one output connected to link 16, another input connected to the output of filter 29 by link 32, through a carrier detection circuit 33 and another output connected to link 30. It also has a triggering input 34.

An example of an embodiment of the control circuit 31 is shown in FIG. 3. It may be seen that the input 14 is connected to the first input of an AND gate 35, whose output is connected to the clock input of a flip flop 36. Furthermore, input 14 is connected through an inverter 37 to the reset input of flip flop 36. The "1" output of flip flop 36 is connected to the first input of an OR gate 38, whose output is connected in parallel to both outputs 16 and 30. The second input to the AND gate 35 and the second input to the OR gate 38 are both connected in parallel to the output of a time constant circuit 39, whose input signal is connected through an inverter to the input 32. Furthermore, the triggering input for circuit 39 is connected to 34. Circuit 39 has as its output signal the signal which is applied at its input for a predetermined amount of time. It operates as a monostable circuit. In the embodiment example described herein, the output of circuit 39 goes to a high level each time the input of 39, which is connected to 40, goes to a high level, and remains as such for say one second before returning to the initial low level. The same operation takes place when the input 34 is activated by using a push button.

The operation of the telewriting system will now be described by reference to FIGS. 1 to 3 and FIG. 4 which shows existing signal waveforms for example, at different points in the control circuit of FIG. 3. Let us assume that stations A and B are related by line 5. Conversation was initiated between microphone 2 of A and speaker 3 of B and conversely, but graphic data acquisition circuit 6 is at rest. To initiate the telewriting operation, for example the operator in station A presses the push-button which activates the input 34, as shown by the impulse (34) in FIG. 4. As shown in curve (41), the output 41 of time constant circuit 39 goes to a high level, thus setting 30 to a high level through OR gate 38. This results in having the commutator 24 close the link between 25 and 23 such that the carrier is transmitted on the line toward station B.

At station B, where 34 has not been activated, the output 41 is at a low level; thus, in the equipment 4 of station B, the commutator 24 transmits the carrier received from A towards detector 33 and the output level of inverter 40 is low.

At station A, the level of wire 41 becomes low at the end of the time constant of timer 39, which, through OR gate 38, sets wire 30 to a low level. The commutator thus stops the transmission of the carrier A and closes the link between the output of hybrid circuit 17 and filter 29.

At station B, the interrupted reception of the carrier from A is detected by circuit 33 and the result is that the input of timer 39, in station B, goes high, thus as previously in station A, the carrier is transmitted from station B towards A. At the end of the time constant of timer 39 in station B, transmission of the carrier from B towards station A is interrupted.

In station A, this interruption is detected in circuit 33 whose output goes to low level thus allowing the output of inverter 40 to pass to a high level, etc.

When a lecturer, in station A, starts to use the graphics table acquisition means 6, a signal is transmitted from coder 7 to logistic circuit 13 which in turn sends an order toward terminal equipment 4 on link 14. In FIG. 4, it is supposed that this order, represented by (14) results in wire 14 passing from a low to a high level while wire 41 is at a high level. The two inputs of the AND gate 35 are simultaneously activated and thus the output of AND gate 35 makes the flip flop 36, whose "1" output is activated, change state. Therefore, through the OR gate 38, the link 30 remains at the high level even when the output 41 is back to the low level. Station A transmits the telewriting information on graphics table acquisition means 6 towards screen 9 of station B. When the lecturer at station A ceases drawing on his table, the link 14 goes to a low level, thus through the inverter 37, the flip flop 36 goes to the "0" state. The wire 30 goes to a low level and carrier transmission from station A towards station B is interrupted. As before, station B will transmit a carrier through the duration of the time constant of its circuit 39, thus the cycle described above starts anew.

It appears, however, that between the instants 42 and 43 in curve (14) of FIG. 4, no speaker of station B can transmit towards station A since the control circuit 31 of station B is blocked in reception.

However, the purpose of circuit 13 is to allow the passage of information from coder 7 towards decoder 10, through wire 11, when 14 and 16 are both at the high level, by breaking the connection between wire 12 and decoder 10 and to allow the passage of information from terminal equipment 4 towards decoder 10, through wire 12, when wires 14 and 16 are at the low level, by breaking the connection between wire 11 and 10.

FIG. 5 gives another example of the realization of a terminal setup 4. As in FIG. 2, the coupler 17, the band-reject filters 18 and 19, the amplifiers 20, 21 and 23, also the modem 28, the control circuit 31, and the carrier detector 33 are all present. However, the commutator 24 is replaced by two inverters 44 and 45 and only one bandpass filter 46 is used. One fixed contact of the inverter 44 is connected to the input of the amplifier 23 while the other fixed contact is connected to the input of the demodulator 27 of modem 28 and to the carrier detector 33. The movable contact of 44 is connected to a bandpass filter 46 whose input is connected to the movable contact of inverter 45. One fixed contact of 45 is connected to the output of the modulator 26 of modem 28 and the other fixed contact to the output terminal of the coupler 17. The inverters 44 and 45 are controlled simultaneously by the output on wire 30 of the control circuit 31.

When device 4 is in the receiving state, the movable contacts of 44 and 45 close the following path: output of hybrid 17, movable contact of 45, filter 46, movable contact of 44 and input of demodulator 27. In the transmission state, the following path is closed: output of modulator 26, movable contact of 45, filter 46, movable contact of 44 and the input of amplifier 23. When the output wire 30 of control circuit 31 is at the low level, the first path described above is established and when at the high level, the second path is established. Thus results the same operation as in the example of FIG. 2 with a saving of one bandpass filter.

Note that in the embodiment examples given in FIGS. 2 and 5, the link 8 is connected to the input of the modulator 26 while the output of the demodulator 27 is connected to link 12. The filters 18, 19, 25, 29 and 46 should preferably be active.

It should be noted that the control circuit of FIG. 3 performs only logical operations. Thus, instead of using a wired structure, an appropriately programmed microprocessor can be substituted to perform this task.

It should also be noted that the system of the present invention offers the advantage that both written and conversational exchanges are simultaneously possible, over a single ordinary telephone line. The frequency window, reserved for the transmission of telewriting is selected from the speech bandpass in such a way as to respect classical transmission norms.

Although the principles of the present invention have been described in relation to particular embodiments, it should be understood that this description was given only as an example and as such does not limit the scope of the invention.

The embodiments of the invention in which an exclusive property or privilege is claimed are defined as follows:

1. A bidirectional telewriting system, which operates in an alternating mode over a single carrier, comprising an information transmission route having opposite ends, two telewriting apparatus respectively connected at said opposite ends of said telewriting information transmission route, the transmission route being connected in each apparatus to a coupler having an input connected by a transmission link to the output of a modulator which modulates the carrier with the local telewriting information, the output of the coupler being connected by a reception link to the input of a demodulator which demodulates the signal coming from the transmission route, the modulator being connected to a telewriting transmitter and the demodulator to an information display apparatus, in which commutators are connected in the transmission and reception links and are adapted to close one link while opening the other link and vice versa, the commutators being controlled by a controlling circuit which causes said commutators to maintain closure of the transmission link when the transmitter from the apparatus in which it is a part is in or is passing to the enabled state and the transmission link is already closed, the control circuit in the other apparatus applying to its associated commutator signals such that the states of the links are the inverse of those in the first apparatus, said system being characterized by the control circuit activating the aforesaid commutators to alternately close the transmission and reception links when said transmitters in the apparatus are at rest and inversely the states of the associated links when the transmitter with its transmission links closed passes to the rest state.

2. A system as defined in claim 1, characterized in that each of the control circuits includes a monostable circuit that is triggered when a drop in the amplitude of the carrier entering the demodulator is detected, the output of the monostable circuit being connected to a logic circuit which forces closure of the transmission link upon detection of the transmitter's enabled state, upon triggering the monostable circuit or opening of the transmission link at the end of the said transmitter's enabled state.

3. A system as defined in claim 1 or 2, in which each telewriting apparatus is associated with a microphone and a speaker from which incoming or outgoing speech signals are transmitted by the aforesaid coupler, characterized by the speech signals occupying the normal frequency bandwidth alloted for telephone communication, except for a window of approximately 200 Hz which is used for transmission of the telewriting signals, the telewriting and speech signal being separated by active filters.

4. A telewriting system comprising a plurality of stations each having at least a local graphic data acquisition means and a graphic signal display means operated responsive to received graphic signals, at least one graphic data transmission channel interconnecting said stations, a local microphone and speaker at each of said stations for transmitting or reproducing voice signals sent over said transmission channel, filter means interposed between said microphone, speaker, graphic data acquisition means and graphic data display means for selectively passing or rejecting audio or graphic signals between said station and said channel, means responsive to an operation of a graphic data acquisition means local to any one of said stations for seizing control of said graphic data transmission channel and simultaneously barring seizure of said channel from another of said stations, means for automatically giving precedence to one of two simultaneous seizures, and means for normally connecting a first of said filter means for passing graphic data signals from said channel to said display means, and means responsive to a receipt of said graphic data signal from said channel for disconnecting said first filter means and connecting a second of said filter means for passing graphic data signals from said local graphic data acquisition means to said channel.

5. The system of claim 4 and commutator means for simultaneously disconnecting said first filter means from and connecting said second means to said transmission channel.

6. The system of claim 4 wherein said first and second filter means comprises a single filter with steering contacts at its input and output, said steering contacts normally connecting said input to said channel and said output to said graphic signal display means to form said first filter means and connecting said input to said graphic data acquisition means and said output to said channel to form said second filter means.

7. A bidirectional telewriting system for operating in alternating modes over a single carrier, said system comprising an information transmission route means extending between two opposite ends; telewriting station means connected to each of said opposite ends of said route means; modulator means, demodulator means, coupler means, control means, and commutator means individually associated with each of said telewriting station means; said coupler means having an input connected through a transmission link means to an output of said modulator means and an output connected through a reception link means to an input of said demodulator means; telewriter transmitter means connected to an input of said modulator means; display means connected to an output of said demodulator means; said commutator means having switching means in said transmission and reception link means for closing either one of said link means while opening the other of said link means; control means in a station where a telewriter transmission means operates for operating said commutator means to close said transmission link means while opening said reception link means responsive to an operation of said telewriter transmitter means and means for operating the control means in the station on the opposite end of said information transmission route means for causing the commutator means thereat to close the reception link means while opening the transmission link thereat, said control means activating said commutators to alternately close the transmission and reception link means when said telewriter transmission means are at rest and inverting said links when said telewriter transmitter means passes from an active to a resting state.

* * * * *